US009004094B2

(12) United States Patent
Colding-Kristensen et al.

(10) Patent No.: US 9,004,094 B2
(45) Date of Patent: Apr. 14, 2015

(54) POWDER VALVE

(75) Inventors: Holger Colding-Kristensen, Hals (DK); Hans Henrik Mortensen, Noerresundby (DK)

(73) Assignee: Tetra Laval Holdings & Finance S.A., Pully (CH)

( * ) Notice: Subject to any disclaimer, the term of this patent is extended or adjusted under 35 U.S.C. 154(b) by 1667 days.

(21) Appl. No.: 12/280,658

(22) PCT Filed: Feb. 23, 2007

(86) PCT No.: PCT/DK2007/000086

§ 371 (c)(1), (2), (4) Date: Aug. 25, 2008

(87) PCT Pub. No.: WO2007/095951

PCT Pub. Date: Aug. 30, 2007

(65) Prior Publication Data

US 2009/0256089 A1 Oct. 15, 2009

(30) Foreign Application Priority Data

Feb. 23, 2006 (DK) ................................ 2006 00256

(51) Int. Cl.
*F16K 11/00* (2006.01)
*F16K 1/12* (2006.01)
(Continued)

(52) U.S. Cl.
CPC ... *F16K 1/12* (2013.01); *F16K 1/36* (2013.01); *F16K 27/0254* (2013.01)

(58) Field of Classification Search
CPC ............................... B01F 1/0027; F16K 1/446
USPC ................. 251/122; 137/240, 605, 625.48, 1, 137/15.04, 268, 592, 625.4, 896; 366/182.4; 406/28, 192, 29, 174
See application file for complete search history.

(56) References Cited

U.S. PATENT DOCUMENTS 1,195,958 A * 8/1916 Ash ............................... 137/592
2,403,751 A * 7/1946 Palmer .......................... 406/192
(Continued)

FOREIGN PATENT DOCUMENTS

AU 47771/72 4/1974
DE 41 12 885 A1 10/1992
(Continued)

OTHER PUBLICATIONS

Supplemental European Search Report in Application No. 07702504.7, dated Jan. 13, 2013, seven pages.

*Primary Examiner* — Kevin Murphy
(74) *Attorney, Agent, or Firm* — Finnegan, Henderson, Farabow, Garrett & Dunner, L.L.P.

(57) ABSTRACT

The present invention concerns a valve (1), a valve closing body (14) and use of a valve (1) and a valve closing body (14) of the type used for injecting dry powder which is mixed with liquid, and where the dry powder is supplied under the liquid surface in a mixing vessel (11) in which a vacuum is typically maintained. The novel feature of a powder valve (1) according to the invention is that a closing body (14) of the valve in the closed position extends through the valve seat (13) of the valve and into the wet environment. It is hereby achieved that when the valve (1) is opened, powder or dust from powder is not deposited on the valve closing body (14). This is in spite of the valve closing body (14) being wet, due to contact with the liquid to which the powder is added. Due to its elongated shape, the valve closing body (14), which in the withdrawn position opens for inflow of powder, has the property that the inflowing powder dries the valve closing body (14) at first and keeps it dry subsequently.

17 Claims, 4 Drawing Sheets

(51) Int. Cl.

| | |
|---|---|
| ***F16K 1/36*** | (2006.01) |
| ***F16K 27/02*** | (2006.01) |

(56) References Cited

U.S. PATENT DOCUMENTS

| | | | | | |
|---|---|---|---|---|---|
| 3,220,693 | A | * | 11/1965 | Dickson | 251/122 |
| 3,289,607 | A | * | 12/1966 | Delligatti | 417/513 |
| 3,326,235 | A | * | 6/1967 | Jones | 137/605 |
| 3,429,331 | A | | 2/1969 | Prevost | |
| 3,845,788 | A | | 11/1974 | Laven | |
| 4,022,512 | A | * | 5/1977 | Autelli | 406/50 |
| 4,099,703 | A | * | 7/1978 | Lush | 251/122 |
| 4,162,795 | A | | 7/1979 | Kanics | |
| 4,383,553 | A | * | 5/1983 | Platt | 138/46 |
| 4,552,490 | A | * | 11/1985 | Neale | 406/56 |
| 4,565,210 | A | * | 1/1986 | Heine et al. | 137/219 |
| 4,599,363 | A | * | 7/1986 | Miles et al. | 514/770 |
| 7,137,612 | B2 | | 11/2006 | Baca | |
| 2004/0190373 | A1 | | 9/2004 | Colding-Kristensen et al. | |

FOREIGN PATENT DOCUMENTS

| | | | |
|---|---|---|---|
| EP | 0 750 143 | A1 | 12/1996 |
| ER | 1 574 764 | A2 | 9/2005 |
| FR | 2 169 060 | A1 | 9/1973 |
| FR | 2 587 780 | A1 | 3/1987 |
| GB | 203 876 | | 9/1923 |
| GB | 1 349 838 | | 4/1974 |
| GB | 1 599 763 | | 10/1981 |

* cited by examiner

POWDER VALVE

FIELD OF THE INVENTION

The present invention concerns a valve, a valve closing body and use of a valve and a valve closing body of the type used for injecting dry powder into a wet environment, where the dry powder is mixed with a liquid, and where the dry powder is supplied to the wet environment under the liquid surface, e.g. in a mixing vessel in which typically a vacuum is maintained.

DESCRIPTION OF PRIOR ART

It is commonly known to supply powder to mixing vessels, to vessels with atmospheric pressure as well as to containers with vacuum. In all simplicity, the quite common method is to dose the desired amount of powder from a container above the mixing vessel or via a pipe connection directly down upon the liquid surface in the mixing vessel. The valve types used in connection with such a method are countless, and there are as such no problems with these valves as they are located dryly. The powder thus does not come in contact with moist or wet surfaces at or in the valve, and the valves are relatively easy to keep clean.

However, by dosing powder from above, it is a fact that the admixing itself may take some time as the powder may tend to cake. Another problem by dosing powder from above is that powder dust may deposit at the inner side of the mixing tank, in particular at the upper part which is not covered by liquid, but which is anyway moist from liquid splashes or condensing liquid. Particularly by production processes, where the dosing amount of ingredients is very important, e.g. in the pharmaceutical industry, it may be a problem if active substances are not mixed into the liquid but are instead left at the inner surface of the vessel. There is, of course, equipment for cleaning the inner sides of mixing tanks, both during operation and during cleaning, but this takes time and we are speaking of resource-demanding processes. Moreover, there is often used mixing vessels where powder and liquid are mixed in a small vessel and subsequently added to the large mixing vessel.

Another way of adding powder to a mixing vessel with liquid is the method mentioned in the introduction where powder is added, infused or injected into the liquid from a position below the liquid surface. In this way is achieved a better and more rapid mixing of powder and liquid. Furthermore, dust from the mixing process is not formed, and therefore no powder is deposited on the internal faces of the vessel, making the dosing more precise and facilitating cleaning considerably.

The prior art types of valves for this purpose, however, have some unsuitable features which will be elucidated in short below.

Valves mounted with access under the liquid surface will, in one way or the other, have elements in contact with the liquid. It is commonly known to use so-called butterfly valves for this process. However, these valves have the unsuitable feature that a relatively large surface, namely largely the entire face of the valve flap facing the liquid, is wetted. When the valve is opened, i.e. when the valve flap is turned, dry powder flows on both sides of the flap, but at the wet side powder, which almost glues itself to the valve flap, is deposited. This accumulation of powder on the valve flap is obviously not desirable, for various reasons. The deposited powder is dosed to form part of the mixture, the free flow area is reduced and the packings and/or valve seat of the valve is destroyed/worn by the deposited powder when the valve is operated.

Furthermore, butterfly valves have the unsuitable feature that the valve flap is situated at the centre of the valve opening, meaning that the powder flow is divided in two parts—one powder stream at each side of the valve flap—whereby there is a risk of bridge formation in the powder, meaning that the flow of powder through the valve is impeded.

It is the purpose of a powder valve according to the present invention to indicate a solution to the above mentioned problems with deposits on the valve closing body and consequent inaccuracies in the mixing process, and to minimise wear on the packings.

DESCRIPTION OF THE INVENTION

The novel feature of a powder valve according to the invention is that a closing body of the valve in the closed position extends through the valve seat of the valve and into the wet environment.

Hereby is achieved the surprising effect that when the valve opens, i.e. when the valve closing body is withdrawn into the part of the valve in which there is powder, powder or dust from powder is not deposited on the valve closing body. This occurs in spite of the valve closing body being wet due to its being in contact with the liquid to which powder is added. Due to its elongated shape, the valve closing body, which in the withdrawn position opens for inflow of powder, has the property that the flowing powder cleans the valve closing body at first and keeps it dry and clean subsequently.

Moreover, by such a valve a full opening of the clearance of the valve is provided, whereby the risk of bridge formation in the powder is considerably reduced.

In a particularly preferred embodiment of a valve according to the invention, the valve closing body in the closed position has an extension into the wet environment corresponding to at least 0.5 times the maximum clearance dimension of the valve seat, and preferably at least corresponding to the maximum clearance dimension of the valve seat. By this design, there is achieved a valve closing body having a length sufficient for the flowing powder to dry the valve closing body and keep it clean.

In a particularly preferred embodiment of a valve according to the invention, the valve is opened and closed with a rectilinear movement. Hereby is achieved the advantage that the valve may be operated with different types of current linear actuators, such as manually, hydraulically, pneumatically or electrically driven actuators.

In a preferred variant, a valve according to the invention has a valve closing body and a valve seat with rotational-symmetric shape. Thus is achieved the advantage that the actuator does not need to be locked against rotation of the piston rod or similar.

A variant of the valve according to the invention is adapted so that the valve closing body is brought into contact with the valve seat with a rotating movement about the rotational-symmetric axis of the valve closing body simultaneously with a rectilinear movement. Hereby is achieved the advantage that powder grains do not get jammed so easily between the valve closing body and the valve seat when closing the valve. Hereby is achieved a longer service life of e.g. the packing of the valve seat.

A particularly preferred embodiment of the valve closing body for a valve according to the invention is characterised in that the part of the valve closing body extending through the plane of the valve seat and into the wet environment has continuously decreasing cross-sectional area.

Hereby is achieved the surprising effect that the powder flowing through the valve acts self-cleaning on the valve closing body, which is almost constantly swept by the flowing powder.

It is not known with certainty whether this is the so-called Coanda effect, which is a commonly known effect where a fluid flowing through a nozzle or an opening have the tendency to follow an adjacent curving surface, if this curve is not too sharp or if the angle between the surface and the flowing fluid is not too acute.

In another variant of the valve closing body according to the invention, the part of the valve closing body in contact with the valve seat in the closed position or which extends into the wet environment is designed rectilinear or according to a mathematical polynomial, preferably a second degree polynomial. The valve closing body may thus be formed with a conical appearance with linear, concave or convex side faces.

With these shapes on the valve closing body, the desired effect that the flowing powder cleans the surface of the valve closing body is achieved. Common to the indicated designs of the valve closing body is that the valve closing body has a greater cross-sectional area at the valve seat than at the free end of the valve closing body in the wet environment. In a preferred embodiment, the free end of the valve closing body is pointed or with a modest cross-sectional area compared with the cross-sectional area at the valve seat.

In a variant of a valve according to the invention, the valve has at least one, preferably two pipe connections to which there may be connected feeding pipes for powder, e.g. vacuum pipes, according to need. If there is no need for more than one feeding pipe, the other pipe connection can be covered by a cover or alternatively by a sight glass.

In order to ensure that the valve always can close tightly, it is possible to adjust the pressure of the valve closing body against the valve seat as the parts are worn or deformed. In a preferred embodiment of the valve, this pressure is adjusted in that the actuator itself, e.g. a pneumatic spring-loaded cylinder, is adjusted steplessly via a thread with which the actuator part is fastened to the valve housing. The desired position is secured and the parts are locked in their mutual position, possibly by means of a lock nut.

Powder in vacuum pipe systems may have the tendency to form a bridge, meaning that the powder packs tightly and is not immediately able to be conducted in the pipes. In order to avoid the powder packing and forming bridge in the valve housing, this is adapted in the way that when the valve is opened, and vacuum enters the valve housing, a little air is sucked in—a kind of "false air"—along the piston rod of the actuator. This air provides that the powder located in the valve housing is slightly fluidised, whereby the powder is more easily accelerated and flows forwards in the valve and into the mixing vessel, which is very important in the opening stage of the valve in order to prevent powder in the valve opening from becoming moist.

This supply of air may be air which by opening the mixing vessel is sucked in through small openings, but may also be definitely pressurised air fluidising the powder. However, normally it is not desirable that much air is added, as foam may easily be formed in the product concerned, which is unwanted.

The position of the valve body may be adjustable in steps or steplessly. For example, there may be regulation in three steps: Where one step is closed, a second step is open with possibility of air inflow from behind, while a third step may be that the valve closing body is entirely withdrawn and closes for air inflow from behind. The last step is particularly suited in connection with cleaning of pipe system, valve and mixing vessel, which is often done with acid or leach. If the air inflow from behind is not shut off, more or less acid or leach will flow out at the valve, which is not desirable.

The valve body and the valve seat can be made of metallic, ceramic and/or polymeric materials. The choice of materials depends entirely on which powders and/or liquids that are in contact with the system in which the valve forms a part. Rubber is e.g. particularly suited for cement powder.

Valve closing body as well as valve seat may be formed so that the parts are replaceable so that the valve may be renovated relatively rapidly and simply according to need.

A further variant of a powder valve may in a special embodiment be with a valve closing body which is entirely or partly elastic, so that the surface of the valve closing body can be changed, possibly by filling with a fluid under pressure or by activating integrated piezo elements. By this change of shape it may be possible to clean a valve closing body, as possible deposits will be broken off and flake off due to the surface strains. This method may, as mentioned, be used on the valve closing body as well as on the valve seat, or other places in the valve.

SHORT DESCRIPTION OF THE DRAWING

The invention is described in more detail with reference to the drawing, where:

Figure 3:
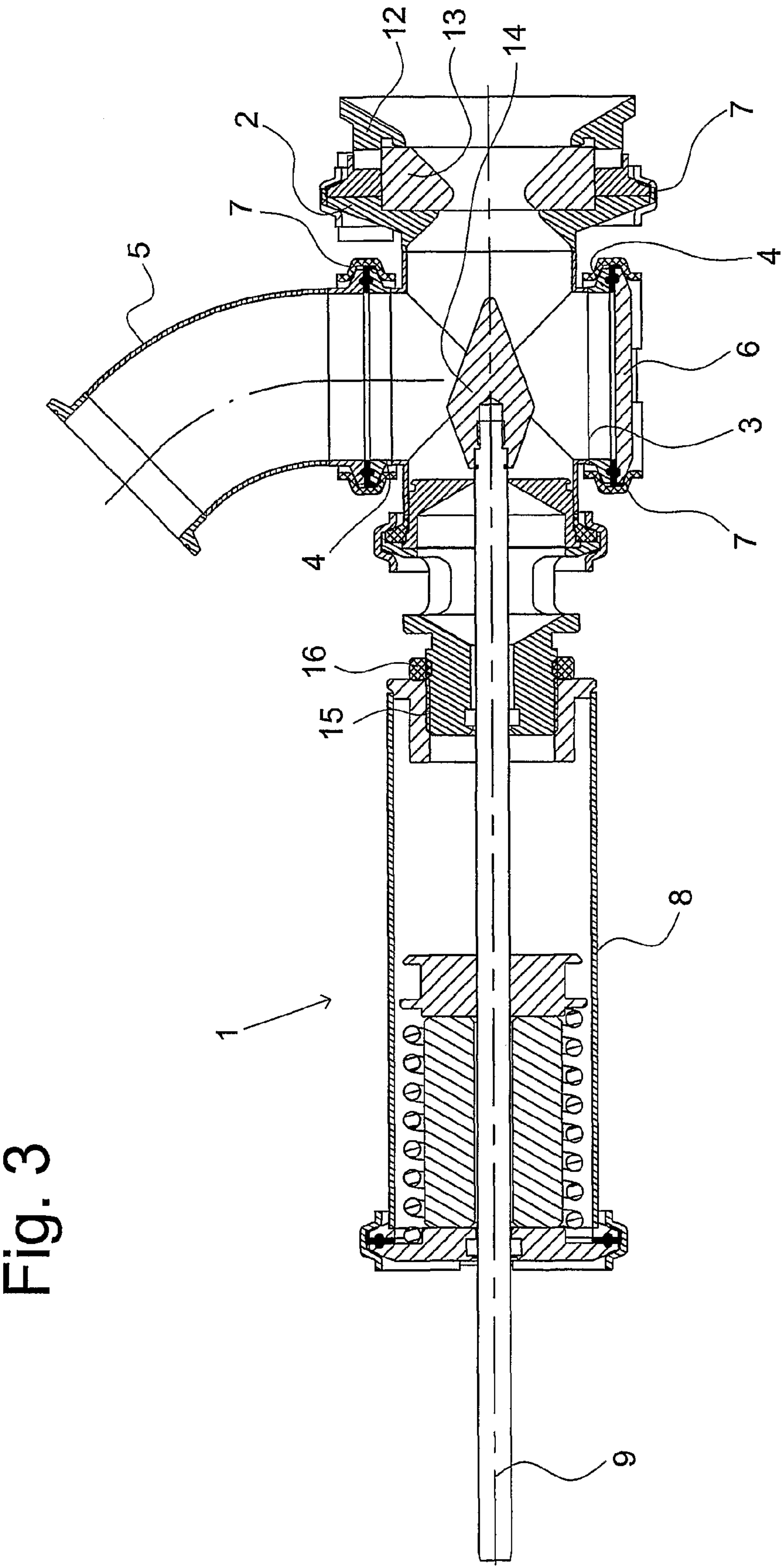
FIG. 3 is a sectional view where the valve is open.
Figure 4:
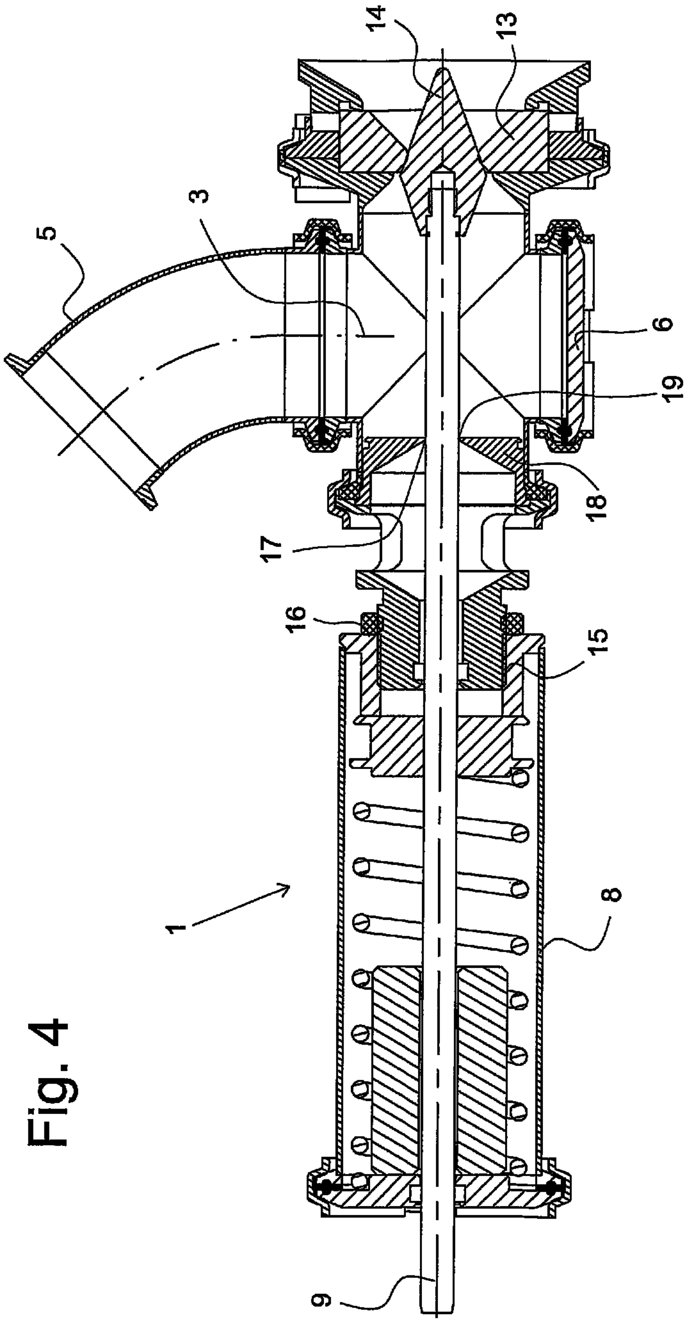

FIG. 4 as FIG. 3, but shown with the valve closed.

DETAILED DESCRIPTION OF THE INVENTION

Figure 1:
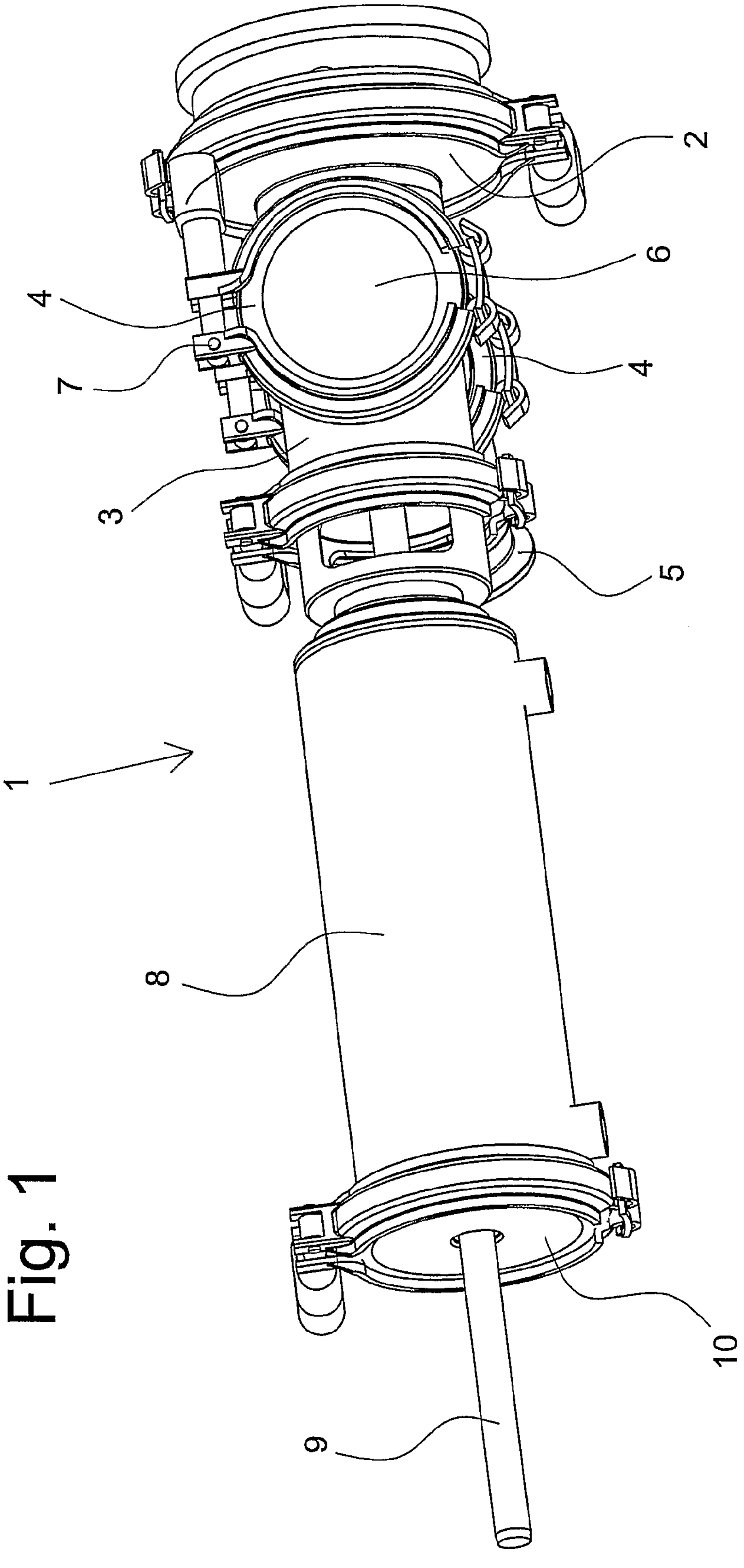
FIG. 1 shows a valve according to the invention as seen isometrically.

FIG. 1 shows a valve 1 according to the invention seen isometrically. The valve 1 is connected via the mounting flange 2 to a not shown container. The valve housing 3 is the part of the valve 1 where the opening/closing function takes place. At the sides of the valve housing 3, there are connecting flanges 4 for feed pipes 5 or alternatively for sight glass 6. These are fixed by straps 7 whereby rapid dismounting may be effected in connection with cleaning or replacement of the valve 1. Finally, the valve actuator 8 is seen where the piston rod 9 projects out through an opening in the end cover 10. In this way it is possible with e.g. a microswitch to detect if the valve 1 is open or closed, respectively. With the projecting piston rod 9 there is furthermore provided the possibility of actuating the valve 1 manually to closing.

Figure 2:
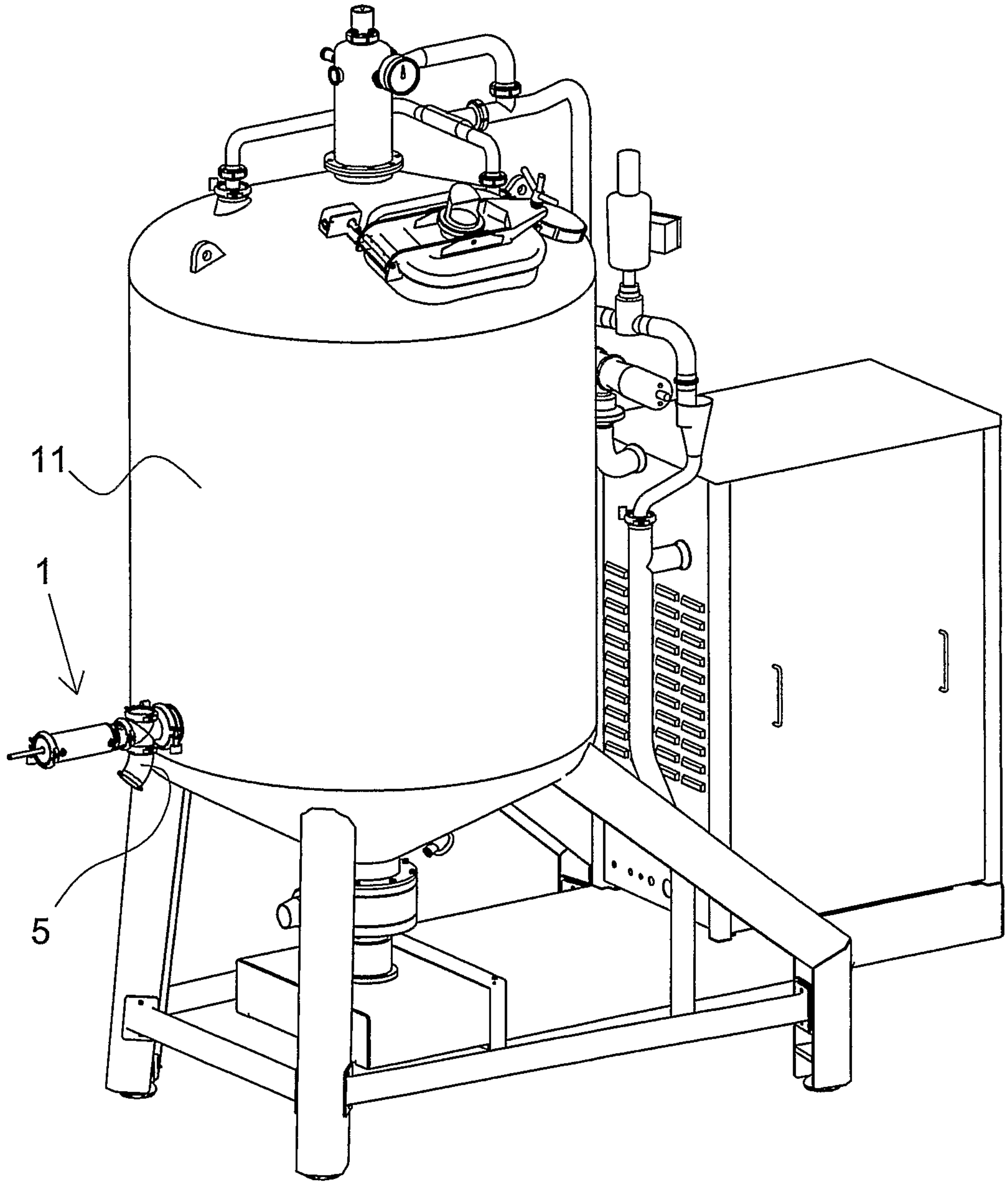
FIG. 2 shows a mixing vessel with the valve mounted.

In FIG. 2, the valve 1 appears mounted on a mixing vessel 11. The shown type of mixing vessel 11 is in principle a known type, however, there may have been made small changes in connection with powder being fed with a valve 1 under the liquid surface, as shown.

FIG. 3 is a sectional view showing the valve 1 as seen from the side with a connecting flange 4 pointing upwards and with one 4 pointing downwards. The upper is mounted with a feed pipe 5 that is fastened with a strap 7. The lower connecting flange 4 is here shown with a sight glass 6 which is also clamped with a strap 7. The shown mounting flange 2 is shown mounted on a welding flange 12 on the Figure, also with strap 7. It is of course the intention that the welding flange 12 is welded to a hole at the side of the mixing vessel 11 shown in FIG. 2. Between the mounting flange 2 and the welding flange 12 there are provided cut-outs for a valve seat 13. Thus it is easy to get access to the valve seat 13 as the valve 1 is easily loosened from its connections by opening the various straps 7.

The valve seat 13 is adapted to the valve closing body 14 so that a suitable contact face is formed between these, whereby a tight connection is achieved. As it appears from FIG. 3, the valve closing body 14 is designed conical. The shape of the valve closing body is very essential to whether deposits are formed by the powder supplied to the mixing vessel 11 through the valve housing 3. If the valve closing body does not have a suitable design, deposits of powder dust are formed on it. If there is a build-up of deposits, the free flow area through the valve housing 3 is reduced, and the deposits will also cause a markedly increased wear on the valve seat. Furthermore, it is a fact that valve closing bodies which are wet on part of the surface have an increased tendency to form deposits, as powder dust is almost bonded to the wet surface. The valve closing body 14 shown in this Figure has a pronounced acute angle as seen relative to the centre line of the piston rod 9. The angle depends on which powder material is dosed, but may be as acute as e.g. 10°; however, the shown valve closing body 14 has an angle of 20° in relation to the centre line of the piston rod 9.

When the valve closing body 14 is so pointed as the case is, it will of course protrude through the valve seat 13 and into the wet environment in the mixing vessel 11, as shown in FIG. 4.

However, even if the valve closing body 14 is wet on part of the surface, no deposits of powder dust are formed on the body 14. Instead, the valve closing body 14 is almost wiped by the flowing powder, because the shape of the valve closing body allows the powder to encircle and flow along its sides. It may be said that the valve closing body 14 is self-cleaning, a fact attributed to the acute angle.

Both in FIG. 3 and in FIG. 4, the valve actuator 8 appears as a pneumatic actuator to which pressurised air is to be connected. The position of this actuator may be adjusted and fixed in that the actuator 8 is turned in a thread 15 and fixed by a lock nut 16. In that way, adaptation of the contact pressure of the valve closing body 14 against the valve seat 13 is enabled.

When the valve 1 is open, i.e. when the piston rod 9 and thereby the valve closing body 14 are withdrawn, away from the valve seat 13, an airstream flows via a small opening 17 between piston rod 9 and its sealing 18. This airstream causes that the powder, which located in the valve housing 3 when the valve 1 opens, is fluidised so that the otherwise compact powder is more easily conducted into the mixing vessel 11. This airstream arises because there is a vacuum in the mixing vessel 11, and that the sealing 18 between piston rod 9 and valve housing 3 is adapted to allow an inflow of air. Alternatively, pressurised air may be applied, but it is often important that excess air is not supplied since it may cause unwanted foaming in the mixing vessel.

Acid or leach is frequently used as cleaning agent by cleaning valve 1 and mixing vessel 11. This cleaning agent is to be kept in the closed system, and therefore the valve 1 is adapted so that piston rod 9 and valve closing body 14 may be set in a special cleaning position. In this position, piston rod 9 and valve closing body 14 are withdrawn so far that the valve closing body 14 is in contact with another valve seat 19 whereby a sufficient sealing between piston rod 9, valve closing body 14 and valve housing 3 is obtained. This position may also be used if it is not desirable with air supply when the valve 1 is open for powder flow.

The valve may thus have one position for operating and another position for cleaning, but may of course be arranged to be adjusted and regulated steplessly with some kind of regulating system.

For a skilled in the art with knowledge within the area of valves for mixing processes, it will be clear after reading the present description that such powder valves may be designed in several other ways, which powder valves, methods of production and ways of application are also to be regarded as being within the scope of the protection.

The invention claimed is:

1. A system for injecting dry powder into a wet environment, the system comprising:
- a mixing vessel containing liquid under vacuum conditions, the liquid having a liquid surface; and
- a valve connected to a powder feed pipe for feeding powder into the valve and connected to the mixing vessel at a level under the liquid surface, such that the valve is in contact with the liquid, and the valve, when open, connecting the powder feed pipe with the liquid for supplying powder from the powder feed pipe into the liquid under the action of vacuum in the mixing vessel,
- wherein by closing the valve a valve closing body, in a closed position, extends from a piston through a first valve seat of the valve and into the wet environment, and wherein by opening the valve, the valve is adapted to allow air to flow in a space between the piston and a second valve seat.

2. System according to claim 1, wherein in the closed position, the valve closing body has an extension into the wet environment corresponding to at least 0.5 times the maximum clearance dimension of the first valve seat.

3. System according to claim 1, wherein the valve closing body is brought into contact with the first valve seat by a rectilinear movement.

4. System according to claim 1, wherein the valve closing body and the first valve seat have a symmetrical shape.

5. System according to claim 1, wherein the valve has at least one pipe connection.

6. System according to claim 1, wherein the valve has at least one connection configured as either a pipe connection or a sight glass.

7. System according to claim 1, wherein the pressure of the valve body against the first valve seat is adjustable.

8. System according to claim 1, wherein the position of the valve body is adjustable in steps or steplessly.

9. System according to claim 1, wherein the valve body and the first valve seat are made of metallic, ceramic and/or polymeric materials.

10. System according to claim 1, wherein the valve closing body and the first valve seat are replaceable.

11. System according to claim 1, wherein the part of the valve closing body extending through the plane of the first valve seat and into the wet environment has a continuously decreasing cross-sectional area.

12. System according to claim 11, wherein a mathematical polynomial defines the part of the valve closing body in contact with the first valve seat in the closed position or which extends into the wet environment.

13. System according to claim 11, wherein the part of the valve closing body in contact with the first valve seat in the closed position or the part of the valve closing body that extends into the wet environment is rectilinear.

14. A method of using the system according to claim 1, wherein the method comprises supplying dry powder to a wet environment under vacuum, and where the supplying takes place directly into a liquid.

15. System according to claim 1, wherein the valve has two pipe connections.

16. A system for injecting dry powder into a wet environment, the system comprising:

a mixing vessel containing liquid under vacuum conditions, the liquid having a liquid surface; and a valve connected to both a powder feed pipe for feeding powder into the valve, and to the mixing vessel at a level under the liquid surface such that the valve is in contact with the liquid, wherein the valve comprises:

a first valve seat;

a valve closing body connected to a piston and adapted to be disposed in an open position and a closed position; and a second valve seat, wherein:

in the open position, the valve allows the powder feed pipe to supply powder from the powder feed pipe into the liquid under the action of vacuum in the mixing vessel, and wherein the valve is adapted to allow air to flow between the second valve seat and the piston, and in the closed position, the valve closing body extends through the first valve seat of the valve and into the wet environment.

17. The system of claim 1, wherein the valve closing body is further configured to be disposed in a cleaning position such that the valve closing body contacts the second valve seat.

* * * * *